United States Patent [19]
Chameroy et al.

[11] Patent Number: 5,370,257
[45] Date of Patent: Dec. 6, 1994

[54] DEVICE FOR AUTOMATIC CONTROL OF A FLOW LIMITING VALVE

[75] Inventors: Eric Chameroy, Veronnes; Jean-Francois Poty; Pascal Vincent, both of Dijon, all of France

[73] Assignee: SEB S.A., Selongen Cedex, France

[21] Appl. No.: 186,138

[22] Filed: Jan. 24, 1994

[30] Foreign Application Priority Data

Jan. 28, 1993 [FR] France .................. 93 01257

[51] Int. Cl.$^5$ .................. A47J 27/08; A47J 27/09; B65D 45/00; B65D 45/34
[52] U.S. Cl. .................. 220/316; 99/337; 99/403; 220/203; 220/293
[58] Field of Search .................. 99/330, 337, 338, 342, 99/403, 340; 220/203, 209, 293, 316, 319, 325, 912; 126/369, 377, 378, 373, 374, 388, 389

[56] References Cited

U.S. PATENT DOCUMENTS

| | | | |
|---|---|---|---|
| 4,251,007 | 2/1981 | Behnisch | 220/316 |
| 4,330,069 | 5/1982 | Bauer | 220/203 |
| 4,423,825 | 1/1984 | Baumgarten | 220/316 |
| 4,541,543 | 9/1985 | Elexpuru | 220/316 |
| 4,620,643 | 11/1986 | Sebillotte | 220/316 |
| 4,685,587 | 8/1987 | Sebillotte | 220/316 |
| 4,717,041 | 1/1988 | Elexpuru | 220/316 |
| 4,735,190 | 4/1988 | Fischbach | 126/377 |
| 4,840,287 | 6/1989 | Brewer et al. | 99/403 |
| 4,982,655 | 1/1991 | Wen-Der et al. | 99/337 |
| 5,048,400 | 9/1991 | Ueda et al. | 99/403 |

*Primary Examiner*—Timothy F. Simone
*Attorney, Agent, or Firm*—Spensley Horn Jubas & Lubitz

[57] ABSTRACT

Device for controlling a flow limiting valve mounted in a cover of an appliance for cooking under pressure, the appliance further including a container to be closed by the cover, the cover having a central axis and the valve being movable between an open position for permitting flow of fluid out of the appliance and a closed position for blocking flow of fluid out of the appliance, the device comprising a cover handle and a bolt mounted in the cover handle for movement between first and second end positions along a line passing through the central axis, the bolt being operatively associated with the valve for permitting free displacement of the valve when the bolt is in the first end position and for preventing the valve from moving to the closed position when the bolt is in the second end position, and wherein: the bolt comprise biasing for elastically urging the bolt toward the first end position; and the device further comprises defining an automatic locking-unlocking system coupled with the bolt for controlling movement of the bolt between the first and second end positions, the system having a first state for locking the bolt in the second end position and a second state for automatically unlocking the bolt when the cover is brought into a position to close the container.

11 Claims, 5 Drawing Sheets

DEVICE FOR AUTOMATIC CONTROL OF A FLOW LIMITING VALVE

BACKGROUND OF THE INVENTION

The present invention relates to the general field of appliances for cooking under pressure, and in particular to appliances of the pressure cooker type comprising a receptacle and a cover secured in a hermetically sealed manner onto the receptacle, the pressure cooker being provided with safety and monitoring devices.

Among the safety and monitoring devices of receptacles which operate under pressure, the present invention concerns particularly a device for controlling a flow limiting valve mounted in the cover of the appliance, the device including a cover handle in which is mounted a bolt, or locking device which is radially slidable between two end, or abutment positions. In one of the abutment positions of the bolt, the valve is liberated and in the other of the abutment positions the valve is maintained in a position for escape of fluid. It is already known to provide a flow limiting valve in the cover of a cooking appliance in order to permit the escape of air imprisoned in the receptacle at the start of cooking. Thus, French Patent No. A-2585229 describes a pressure cooker whose cover is equipped with a flow limiting valve housed in a body mounted in an opening arranged in the cover. The valve is intended to block the seat of the body starting from a certain internal operating pressure, and to allow air contained in the receptacle to pass to the outside when the pressure in the receptacle is below a certain level. In its upper position of closing the seat, the upper extremity of the valve comes to engage in an orifice formed in a bolt mounted to be radially movable in the cover. This latter position thus corresponds to that in which the cover is closed and the pressure cooker is under pressure. When the user wishes to open the pressure cooker, he first opens the safety valve permitting steam under pressure to be evacuated, which correspondingly liberates the flow limiting valve which comes to occupy its lower position and frees the bolt. This latter can then be placed in movement by a push button activated by the user's finger in order to come to occupy an unlocking position permitting removal of the cover from the receptacle. Inversely, during closing, the user, after having put the cover in place on the receptacle and having rotated the cover to a specific position, must bring the bolt into the position which permits free lifting of the flow limiting valve while acting on the push button. At the start of the cooking phase, cool air is evacuated via the valve which remains in its lower position as long as a certain temperature level and minimal pressure have not been attained.

Such a known device suffers essentially from inconveniences associated with the presence of a handle which extends essentially radially and which must of necessity have a length sufficient to permit the hand of a user to be able to freely activate the push button for freeing the bolt. This cumbersome arrangement is perceived in a particularly negative manner by users, particularly in view of the limited space generally available in a kitchen for storage of appliances, on the one hand, and taking into account the increased risks of overturning appliances which have parts, such as handles or other elements, that protrude from the main body of the appliance.

Finally, such a device presents the drawback of being operated manually, when consumers presently look for appliances which require little or no manual operation.

SUMMARY OF THE INVENTION

It is an object of the present invention to remedy the drawbacks noted above, and to provide a new control device for a flow limiting valve permitting the appliance to be less cumbersome and permitting an automatic control of the valve, while maintaining complete safety.

Another object of the invention is to provide an automatic control device for a flow limiting valve in which the automatic nature of the control is effectuated as conveniently during the closing phase of the appliance as during the opening phase.

A further object of the invention is to provide an automatic control device for a flow limiting valve in which rearming, or resetting, of the device is effectuated automatically.

The above and other objects are achieved, according to the invention, by a device for controlling a flow limiting valve mounted in a cover of an appliance for cooking under pressure, the appliance further including a container to be closed by the cover, the cover having a central axis and the valve being movable between an open position for permitting flow of fluid out of the appliance and a closed position for blocking flow of fluid out of the appliance, the device comprising a cover handle and bolt means mounted in the cover handle for movement between first and second end positions along a line passing through the central axis, the bolt means being operatively associated with the valve for permitting free displacement of the valve when the bolt means is in the first end position and for preventing the valve from moving to the closed position when the bolt is in the second end position, and wherein: the bolt means comprise biasing means for elastically urging the bolt means toward the first end position; and he device further comprises means defining an automatic locking-unlocking system coupled with the bolt means for controlling movement of the bolt means between the first and second end positions, the system having a first state for locking the bolt means in the second end position and a second state for automatically unlocking the bolt means when the cover is brought into a position to close the container.

BRIEF DESCRIPTION OF THE DRAWING

Characteristics and advantages of the invention will become more apparent from a reading of the description presented herebelow, by way of non-limiting example, and by reference to the drawings in which.

DESCRIPTION OF THE PREFERRED EMBODIMENTS

Figure 1:
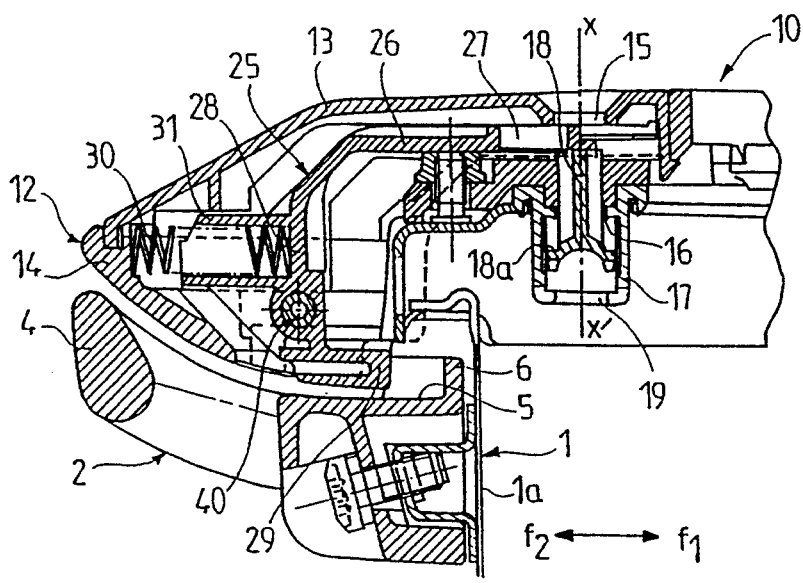
FIGS. 1 and 1a are detail views, FIG. 1 being a cross-sectional view along line I—I of FIG. 1a, and FIG. 1a being a top view, partially broken away, showing a cover handle and a container handle in the cover opening position, the handles being provided with a control device according to the invention.

The control device of a flow limiting valve is intended to be fitted to a pressure cooking appliance, such as pressure cooker for example, comprising, as shown for example in FIG. 1, a container 1 having a side wall 1a, which is for example cylindrical, provided with at least one container handle 2. This latter is fixed by any appropriate means to side wall 1a and presents an ergonomic profile which facilitates gripping. For this purpose, container handle 2 comprises a central cut-out 3 defining, as shown for example in FIG. 1a, an external hand grip 4. In the zone of container handle 2 opposed to external hand grip 4 and consequently situated in the vicinity of side wall 1a, container handle 2 has a flat surface 5 which terminates in the vicinity of side wall 1a at a rim 6 alongside side wall 1a.

Figure 3:
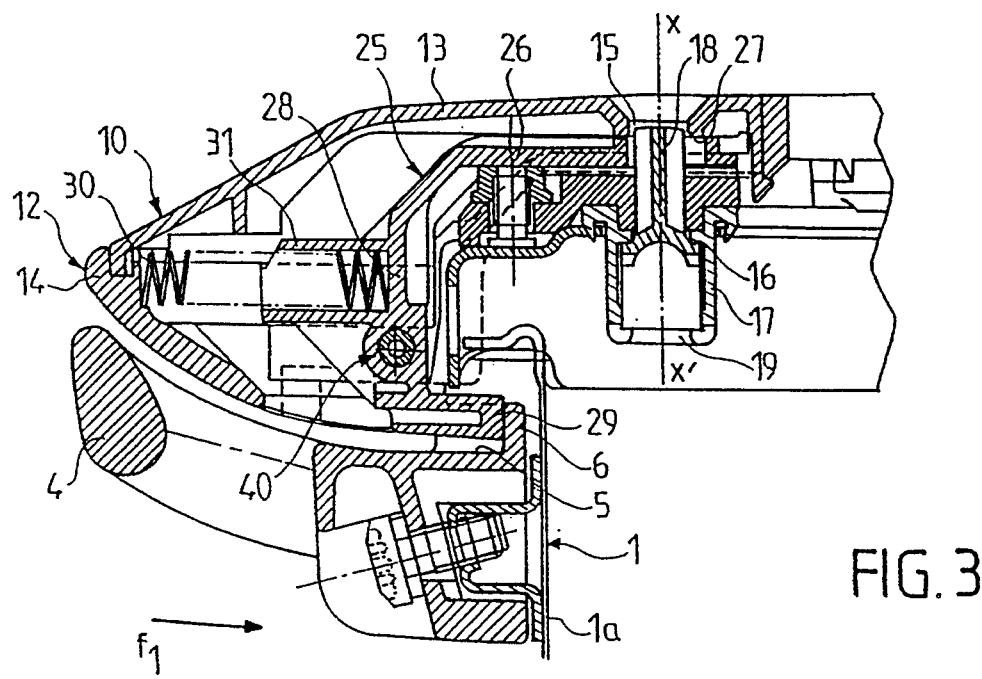
FIGS. 3 and 3a are views similar to those of FIGS. 1 and 1a, showing the same elements as the preceding figures, with the handles being in the closing position.
Figure 3A:
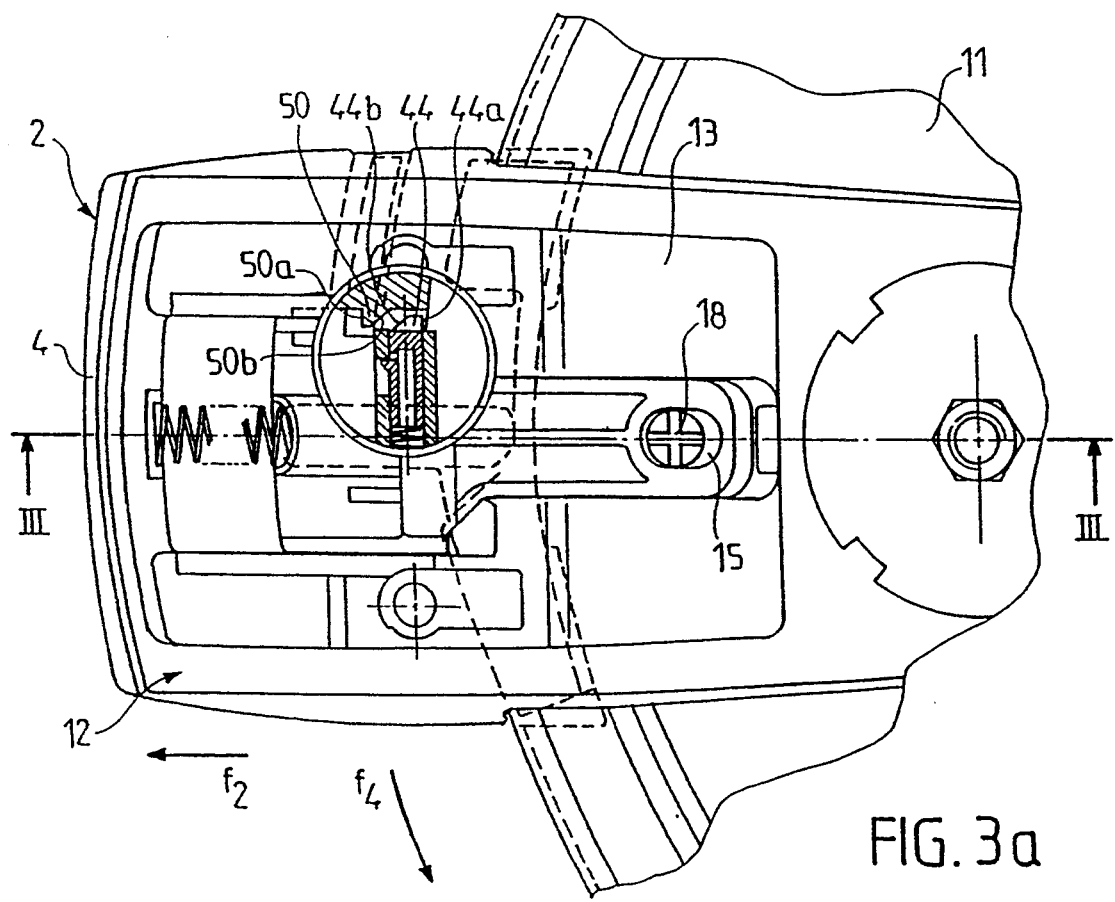
Figure 4:
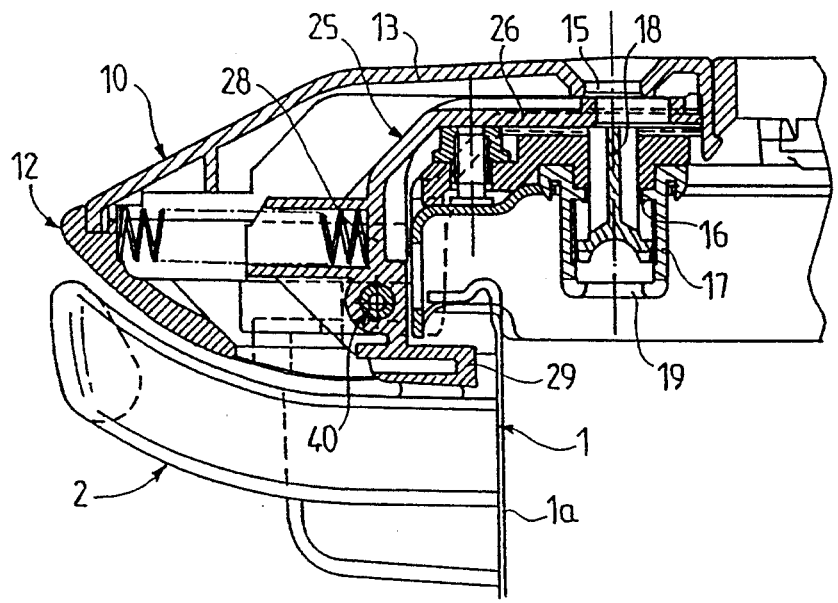
FIGS. 4 and 4a are views similar to those of FIGS. 1 and 1a showing the same elements as the previous figures, with the handles being in the opening position and the control device according to the invention being in its unlocking position.
Figure 4A:
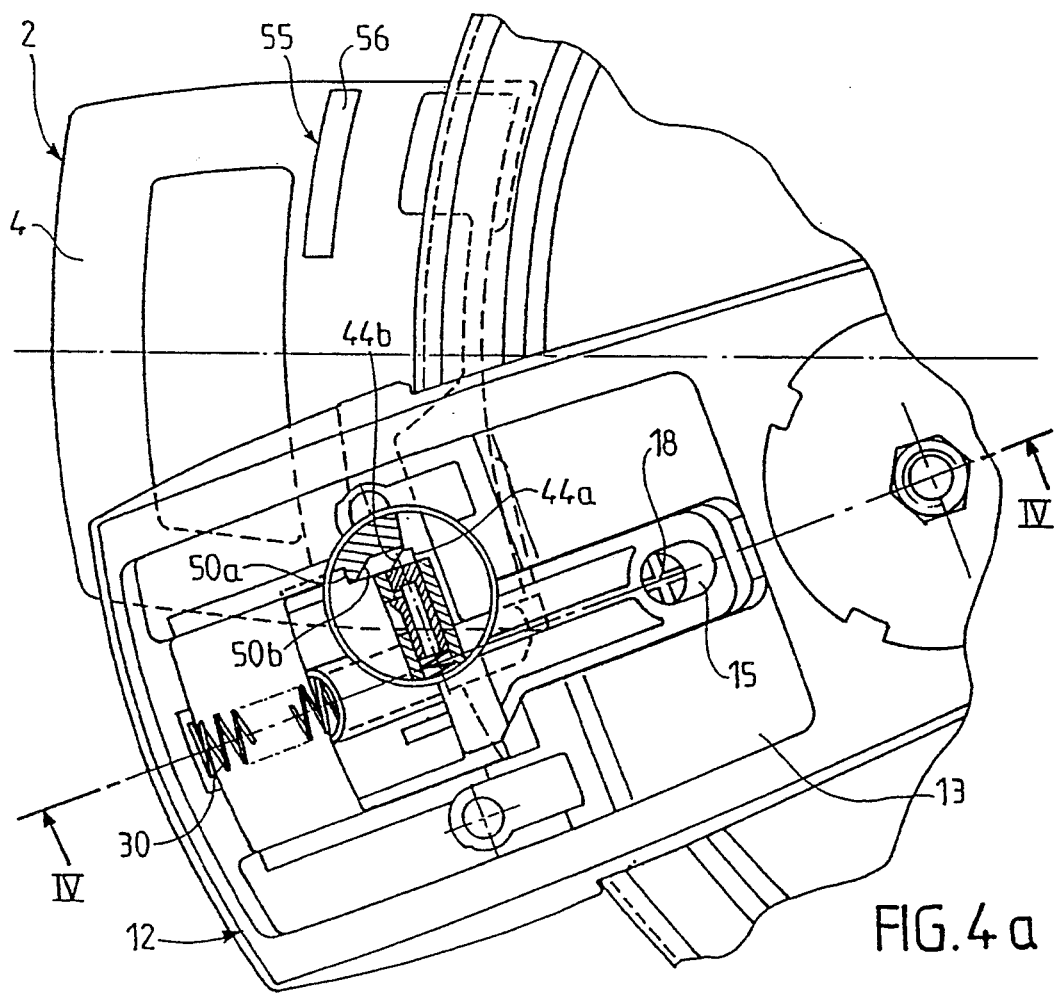
Figure 5:
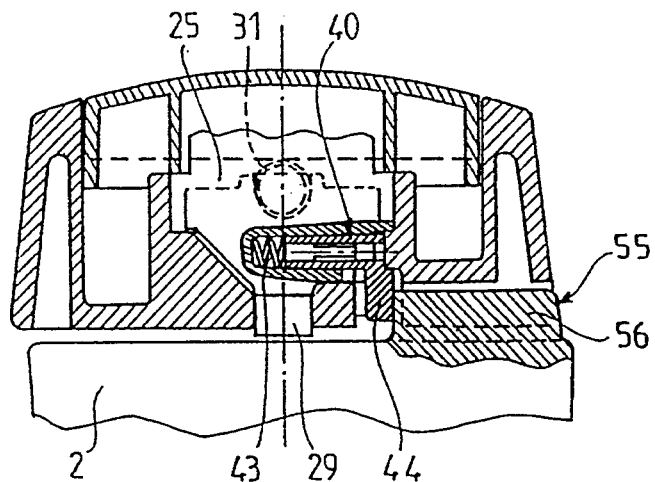
FIG. 5 is a cross-sectional detail view of an embodiment of a bolt or locking device according to the invention.

Container 1 is intended to be closed, for example with the aid of a bayonet latching system composed of peripheral ramps spaced apart about the circumference of container 1 and on a cover 10. Cover 10 is bounded at the outside, at its upper part, by a closing plate 11. Cover 10 is provided with a cover handle 12 arranged to be superimposed above and aligned with container handle 2 in the closing position of the appliance, which position is shown in FIG. 3a. Cover handle 12 is bounded toward the outside by a cap 13 forming the upper and lateral parts of cover handle 12, cap 13 being fixed to a lower piece 14 forming the lower part of cover handle 12. Cap 13 and lower piece 14 are fixed together to form a unitary structure. A part of cap 13 which is intended to be situated above container 1 is provided with an orifice 15 aligned with an opening 16 of a piece forming the body 17 of a flow limiting valve 18. Valve 18 is mounted to be freely movable along an axis x—x' of body 17 between a lower position (not shown in the drawings) corresponding substantially to atmospheric pressure, and an upper position, which is shown in FIG. 3. Valve 18 is provided with an annular gasket or sealing ring 18a which, in the upper position of valve 18, comes into sealing engagement with opening 16 forming a watertight seal seat. In the lower position of valve 18, and in all of the intermediate positions of valve 18 preceding the watertight sealing position shown in FIG. 3, there is a free circulation of air between the surrounding environment and the internal volume of container 1 via orifice 15, opening 16 and a hole 19 formed in the lower part of body 17.

The control device for valve 18 according to the invention also includes a latch or bolt 25 mounted to perform a radial sliding movement with respect to the center, or longitudinal, axis (not shown in the drawings) of container 1, bolt 25 being slidable radially in cover handle 12. Bolt 25 defines a piece having essentially the form of an L and includes a first leg 26 substantially parallel to cap 13 and provided with a through hole 27 and a second leg 28 extending substantially perpendicularly to first leg 26 and provided at its end with a control finger 29. Bolt 25 is mounted for elastic sliding movement aided, for example, by a compression spring 30 inserted into a housing 31 of bolt 25, compression spring 30 producing a restoring force in the direction of arrow $f_1$ (FIG. 1) toward the center of container 1. The force produced by compression spring 30 defines a return position of bolt 25 corresponding to a first abutment position constituting a radial inward return position. Bolt 25 is mounted to undergo radial sliding in the two opposed senses $f_1$, $f_2$ between two abutment positions. When bolt 25 attains the end, or abutment, position shown in FIG. 3 corresponding to its first end position, control finger 29 is, for example, supported against rim 6 and the axis of through hole 27 is aligned with axis x—x' of body 17. In this first end position, valve 18 is freed by bolt 25 and is thus freely movable along axis x—x' in body 17 and can occupy any position between its lower position and its upper position depending on the pressure conditions existing in container 1. In particular, valve 18 can occupy its upper position, or sealing position corresponding to a normal operating pressure for the appliance, the two handles being, obviously, in the closing position. Bolt 25 has at least one structurally defined abutment position corresponding to a limitation of its displacement in the sense $f_2$. This second abutment position, forming a radially outward abutment position, is for example that shown in FIG. 1. In this second position, through hole 27 is no longer aligned with axis x—x'. The extremity of first leg 26 is situated above and at least in part to the right of opening 16 and, as a consequence, impedes free displacement of valve 18 by blocking its upper extremity, valve 18 thus being prevented from attaining its upper, sealing, position. In this second abutment position, bolt 25 maintains valve 18 in a flow escape position permitting free communication between the interior of container 1 and the surrounding environment, which permits, at the start of cooking, an escape air flow toward the exterior.

Bolt 25 is associated with a automatic locking-unlocking system 40 for controlling the sliding movement of bolt 25, the system assuring on the one hand a locking in position of bolt 25 in response to the restoring force in the sense $f_1$ of compression spring 30 in a position corresponding substantially to the second abutment position (FIG. 1), and on the other hand automatic unlocking during closing of cover 10 on container 1 of the cooking appliance.

Figure 1A:
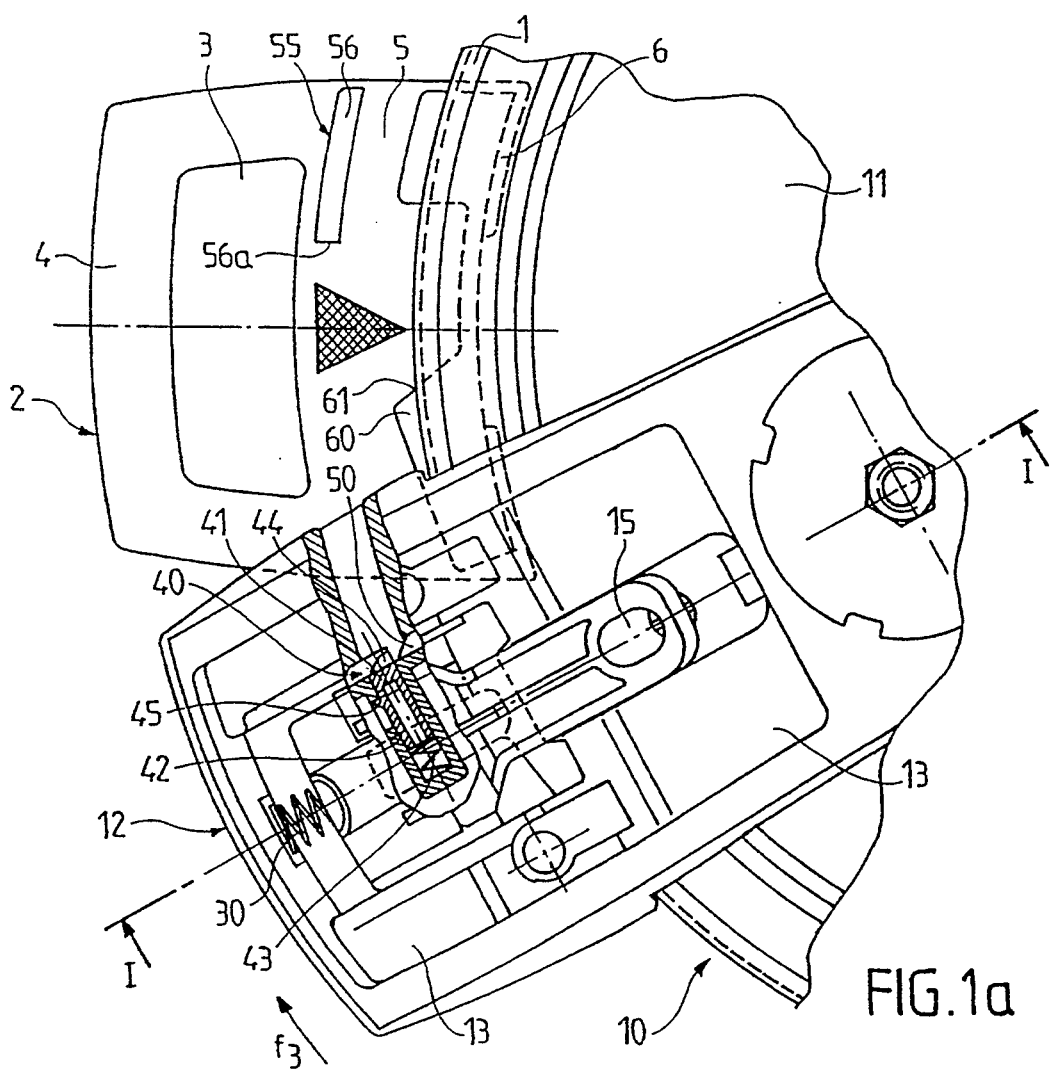

Automatic locking-unlocking system 40 comprises locking means including a trigger or tumbler 41 (which can be seen in FIGS. 1a, 2a, 3a and 5) displaceably mounted in a bore in a receiving member 42 provided in the body of bolt 25. Receiving member 42 and tumbler 41 extend substantially at right angles to the direction of sliding movement of bolt 25 and in a plane substantially parallel to closing plate 11 of cover 10. Tumbler 41 is movable against a compression spring 43 which is interposed between tumbler 41 and the base of receiving member 42, so that displacement movements of tumbler 41 have an elastic quality determined by the spring constant of compression spring 43. Tumbler 41 has a terminal part, which is remote from compression spring 43, provided with a locking lug 44 which has a locking face 44a (FIG. 3a) that extends at right angles to the base of receiving member 42 and to the sense $f_1$, as well as a withdrawal or retracting face 44b inclined with respect to locking face 44a. Travel of tumbler 41 under the effect of the force produced by compression spring 43 is limited to a reset, or retracted, position by a pin 45 which is retained in a slot formed in receiving member 42. The length of the slot is selected so that locking lug 44 can project sufficiently out of receiving member 42 when pin 45 comes to abut against the end of the slot which is remote from compression spring 43. The locking means equally include a locking counter-lug 50 which is fixed to cover handle 12, in a manner to be stationary relative thereto. Locking counter-lug 50 provides a locking counter-face 50a and an incline release counterface 50b (FIG. 3a). Locking counter-lug 50 and locking lug 44 are mounted relative to one another as illustrated in FIG. 1a, for example, in a manner to cooperate in order to block sliding of bolt 25 under the influence of the restoring force of compression spring 30, substantially in its second abutment position shown in FIGS. 1 and 1a. Blocking is effectuated by relative engagement of locking face 44a and locking counter-face 50a.

Figure 2:
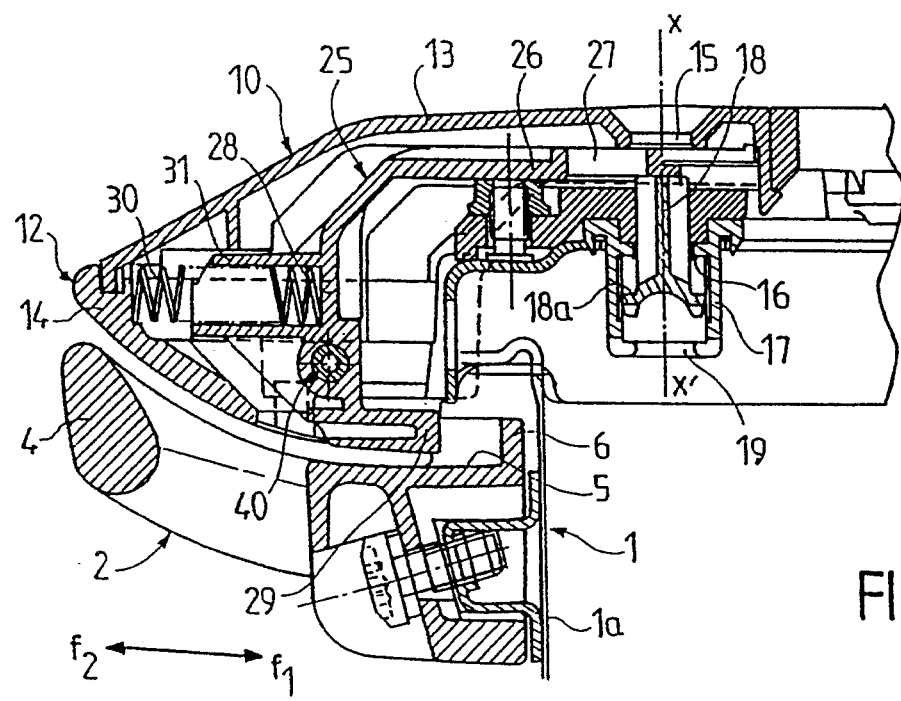
FIGS. 2 and 2a are views similar to those of FIGS. 1 and 1a, respectively, showing the cover handle in its final pre-closing position with respect to the container handle, the cover handle being provided with a control device according to the invention.
Figure 2A:
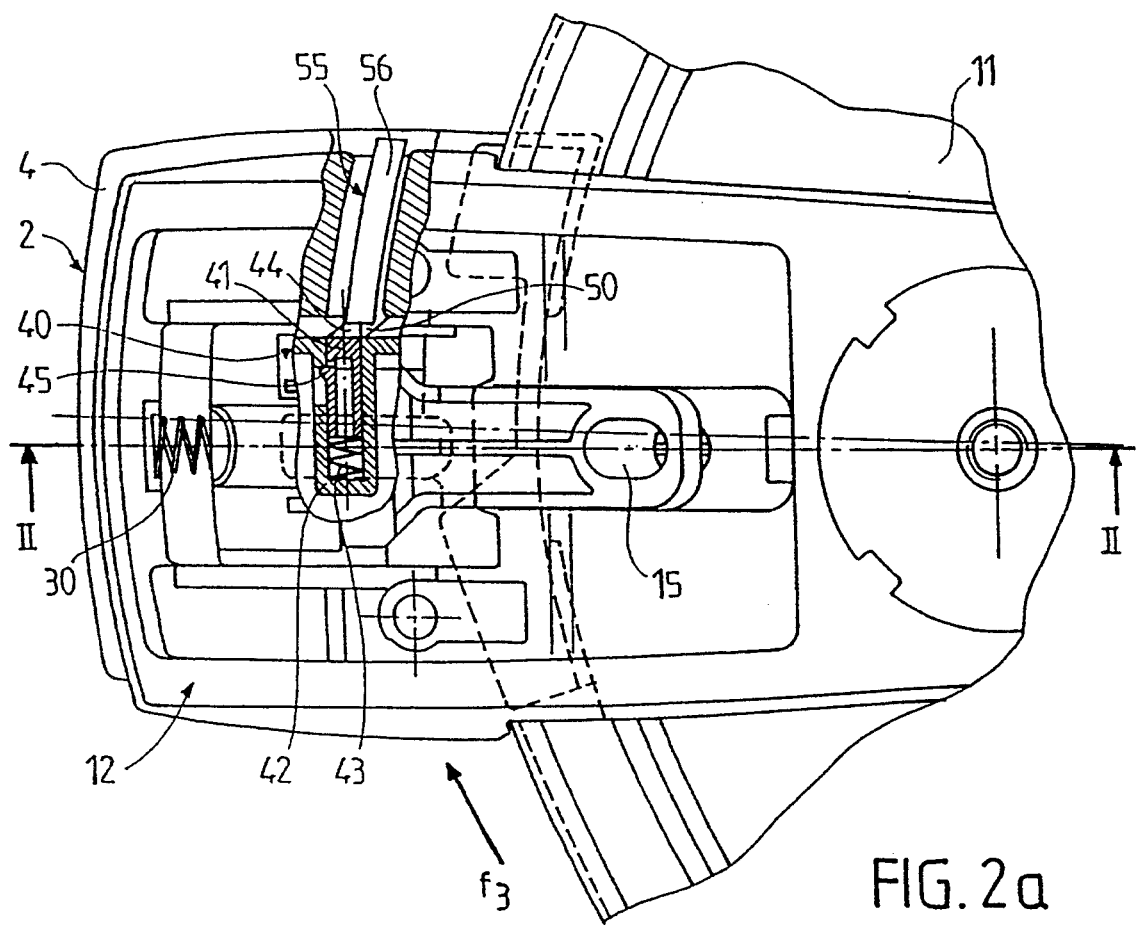
Figure 6:
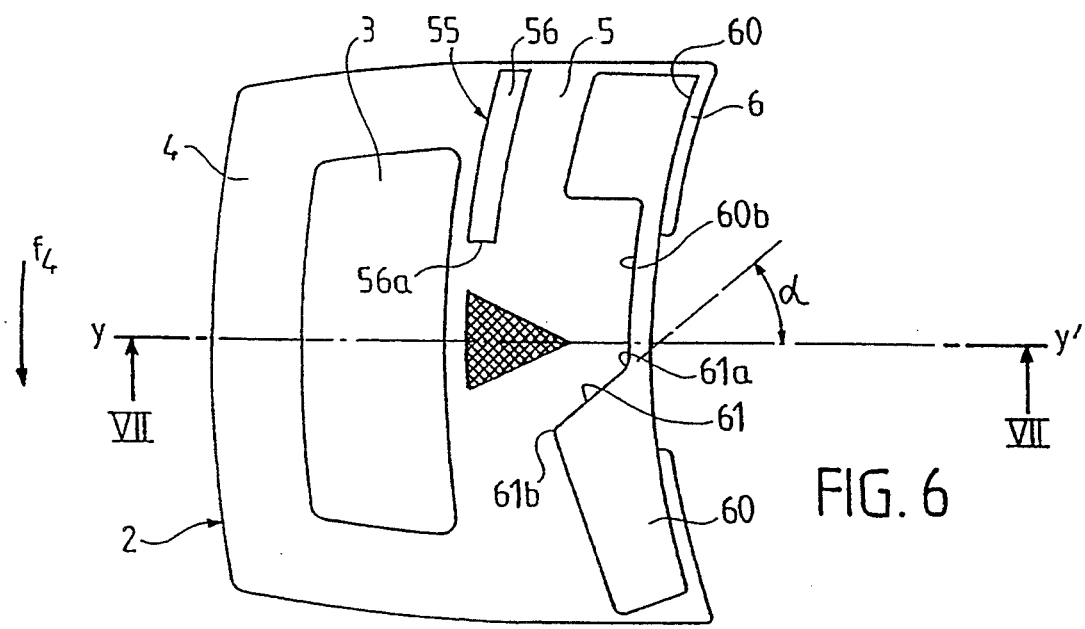
FIG. 6 is a top view of a container handle provided with a release means according to the invention.
Figure 7:
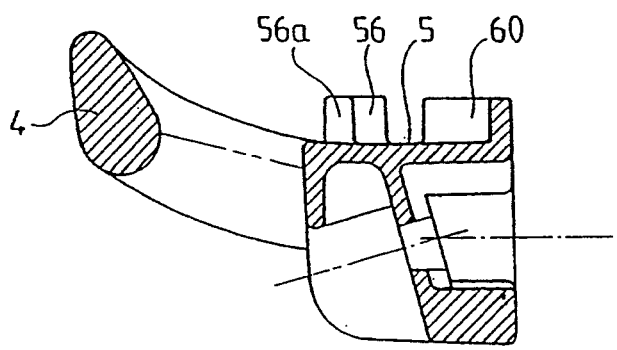
FIG. 7 is a cross-sectional view taken along the line VII—VII of FIG. 6 showing the container handle provided with release means and a control ramp according to the invention.

Automatic locking-unlocking system 40 also includes release means 55 arranged to act on the locking means when cover 10 is closed with respect to container 1 in order to assure separation of the locking means in order to free bolt 25. Release means 55 are located on container handle 2, advantageously on flat surface 5 in proximity to the lateral edge thereof in a manner to be engaged only when cover handle 12 moves into the vicinity of its closing position relative to container handle 2. This position, called a pre-closing position, is illustrated in FIG. 2a and corresponds to the onset of alignment of the two handles. Advantageously, release means 55 includes a release abutment 56 having substantially the form of a parallel pipette, for example, protruding above flat surface 5 and including an abutment face 56a arranged to be engaged by at least a lower part of locking lug 44 in order to cause displacement of tumbler 41 under the influence of the force of compression spring 43. Thus displacement under the influence of the force of compression spring 43 permits locking lug 44 to withdraw into receiving member 42 and, consequently, to leave its locking position relative to locking counter-lug 50 by relative disengagement of locking face 44a and locking counterface 50a, and to thus provoke release, or liberation, of bolt 25. A device for automatic control of a flow limiting valve according to the invention includes means for automatically resetting, or rearming, automatic locking-unlocking system 40, these means being activated during opening of the cooking appliance and setting in motion the rotation of cover handle 12 relative to container handle 2. The automatic rearming means include control finger 29 fixed to bolt 25 and preferably situated at the extremity of second leg 28 to constitute the lower part of bolt 25. The automatic rearming means also comprise a control ramp 60, shown most clearly in FIG. 6. Control ramp 60 is fixed to container handle 2 and protrudes above flat surface 5. Control ramp 60 defines an incline cam surface 61 defining an angle $a$ with an axis of symmetry y—y' of container handle 2 and situated in the vicinity of that axis of symmetry and at the side thereof corresponding to the direction of opening movement of cover handle 12 relative to container handle 2. Control ramp 60 is composed at least in part of rim 6 and also defines a base section 60b which is perpendicular to the axis of symmetry y—y' and extends predominantly to the side of that axis which is opposite to the side of the axis where cam surface 61 is located. In the closing position of the appliance, control finger 29 rests against base section 60b, which corresponds to the first abutment position of bolt 25. The placement of control ramp 60 and cam surface 61 on flat surface 5 are selected to assure that control ramp 60 will be engaged by control finger 29 during the opening which is effected by rotation of cover 10. In the same manner, the inclination and the length of cam surface 61 are made sufficient to permit, when control finger 29 engages the lowest part 61a of cam surface 61, control finger 29 to be displaced by an amount proportional to the degree of opening in a direction having an outwardly directed radial component, which leads, when control finger 29 reaches the outermost point 61b of cam surface 61, to a rearming of bolt 25. In effect, when control finger 29 is displaced along cam surface 61, bolt 25 is progressively caused to slide in the sense $f_2$ in order to reach the second abutment position. During the course of this sliding, locking lug 44 comes to bear equally progressively by its retracting face 44b against locking counter-lug 50 and more precisely against release counter-face 50b, which permits tumbler 41 to withdraw in order to permit automatic rearming of locking lug 44 against locking counter-lug 50, which position is illustrated in FIG. 1a.

The operation of the automatic control device according to the invention will now be described.

Before closing the cooking appliance, the user prepositions cover 10 on container 1 in the manner shown in FIG. 1a in a manner such that container handle 2 and cover handle 12 are offset from one another, i.e. they are not superimposed on one another. In this position, bolt 25 occupies its second abutment position corresponding to that shown in FIG. 1, a position in which valve 18 is not free to move in body 17. The user then proceeds progressively with closing of the appliance by producing a rotational movement in which cover handle 12 moves relative to container handle 2 in the direction of arrow $f_3$ toward a position in which container handle 2 and cover handle 12 are vertically superimposed on, and aligned with, one another, as illustrated in FIG. 2a. This is the pre-closing position of the appliance.

In the pre-closing position shown in FIG. 2a, container handle 2 and cover handle 12 are not yet completely aligned and it can be seen on FIG. 2a that locking lug 44 comes to engage front abutment face 56a of release abutment 56. In this pre-closing position, valve 18 is, as shown in FIG. 2, always prevented from experiencing a free displacement by the exterior of first leg 26 which partially blocks orifice 15. It should thus be noted that during the course of this phase of closing, valve 18 always being maintained constantly in an open condition, it is always possible for fluid to escape, and this constitutes a non-negligible safety factor.

In pursuing the movement which finally results in superposition and alignment of container handle 2 and cover handle 12, the user effects relative movement until the position shown in FIG. 3a is reached, which position produces a complete and hermetic closing of the cooking appliance. During passage from the position shown in FIG. 2a to the position shown in FIG. 3a, tumbler 41 is engaged by abutment 56 and is displaced toward the interior of receiving member 42 against the force produced by compression spring 43, which has as a result to disconnect and separate locking lug 44 from locking counter-lug 50. From that time bolt 25 is unlocked and subjected to the action of compression spring 30 and comes to occupy the first abutment position shown in FIG. 3. In this position, corresponding to the closing position of the cooking appliance, through hole 27 is aligned with the axis x—x', and thus with orifice 15 and opening 16, which permits a free displacement, as of complete closing of the cooking appliance, of valve 18 which can respond freely to the pressure conditions existing at the interior of the appliance.

The pressure and temperature being low at the start of cooking, valve 18 thus permits evacuation of cool air from the interior of the appliance, valve 18 only then being displaced progressively toward opening 16 forming the watertight sealing seat.

The automatic control device according to the invention thus assures that valve 18 is only free to close when the appliance is in its final closed position, while in all other intermediate positions, valve 18 is maintained in an open position in which fluid flow is permitted.

Inversely, during opening, rearming of bolt 25, i.e. its passage from the position of liberating the valve, as shown in FIG. 3, to the position of blocking the valve, shown in FIG. 1, is effectuated automatically by the action of control ramp 60 and its cam surface 61. At the time of opening of the appliance and of rotation of cover handle 12 in the direction of arrow $f_4$ in FIG. 3a, control finger 29, in coming to bear against cam surface 61 and to be displaced therealong, will control the displacement of bolt 25 in the direction of arrow $f_2$. During the course of its displacement in the direction of arrow $f_2$, bolt 25, and in particular locking lug 44, withdraws progressively into the interior of receiving member 42 while bearing against release counter-face 50b of locking counter-lug 50. The withdrawal of locking lug 44 is interrupted when this latter has completed travel along release counter-face 50b of locking counter-face 50a, which permits compression spring 43 to propel tumbler 41 from within receiving member 42, thus permitting an automatic rearming of the locking means into the position shown in FIG. 1a. Bolt 25 is thus again blocked in a position preventing all movement of valve 18. It is equally important to note that the opening of the cooking appliance is rendered impossible as long as the pressure has not returned to atmospheric in the appliance, or as long as the pressure maintains valve 18 in its sealing position, because the maintenance of valve 18 in its upper position, as shown in FIG. 3, prevents any sliding of bolt 25 in the sense $f_2$.

This application relates to subject matter disclosed in French Application number 9301257, filed on Jan. 28, 1993, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. Device for controlling a flow limiting valve mounted in a cover of an appliance for cooking under pressure, the appliance further including a container to be closed by the cover, the cover having a central axis and the valve being movable between an open position for permitting flow of fluid out of the appliance and a closed position for blocking flow of fluid out of the appliance, said device comprising a cover handle and bolt means mounted in said cover handle for movement between first and second end positions along a line passing through the central axis, said bolt means being operatively associated with said valve for permitting free displacement of said valve when said bolt means is in said first end position and for preventing said valve from moving to said closed position when said bolt is in said second end position, and wherein:

said bolt means comprise biasing means for elastically urging said bolt means toward said first end position; and said device further comprises means defining an automatic locking-unlocking system coupled with said bolt means for controlling movement of said bolt means between said first and second end positions, said system having a first state for locking said bolt means in said second end position and a second state for automatically unlocking said bolt means when the cover is brought into a position to close the container.

2. A device as defined in claim 1 wherein said automatic locking-unlocking system comprises locking means operative to assure blocking of said bolt means in said second end position and release means disposed for acting on said locking means as the cover is brought into the position to move said locking means to a position which unlocks said bolt means.

3. A device as defined in claim 2 wherein said locking means are situated on said cover handle and said release means are disposed on said cover handle, the container has a container handle on which said locking means are mounted, and said release means are disposed on the container handle, the cover handle and the container handle being movable relative to one another to a position in which they are superimposed on one another when the cover is in the position to close the container.

4. A device as defined in claim 3 wherein said locking means comprise: a receiving member in said bolt means; a tumbler mounted in said receiving member for movement relative to said receiving member; and a locking counter-lug fixed to said cover handle; said tumbler having a locking lug, and further wherein said locking counter-lug and said locking lug are movable relative to one another in a manner to cooperate for blocking said bolt means substantially in said second end position.

5. A device as defined in claim 4 wherein said tumbler is mounted to be elastically urged in a direction substantially perpendicular to the line passing through the central axis of the cover.

6. A device as defined in claim 5 wherein said release means comprise an abutment fixed to the container handle and disposed on the container handle in a manner to be engaged by said tumbler when said cover handle approaches the position in which the cover handle and the container handle are superimposed on one another to cause displacement of said tumbler out of a blocking position and to liberate said bolt means.

7. A device as defined in claim 4 wherein said release means comprise an abutment fixed to the container handle and disposed on the container handle in a manner to be engaged by said tumbler when said cover handle approaches the position in which the cover handle and the container handle are superimposed on one another to cause displacement of said tumbler out of a blocking position and to liberate said bolt means.

8. A device as defined in claim 1 wherein said means defining an automatic locking-unlocking system comprise automatic rearming means which are disposed to be actuated when the cover is moved from the position to close the container.

9. A device as defined in claim 8 wherein the container has a container handle and said automatic rearming means comprise a control finger fixed to said bolt and a control ramp engageable by said control finger, said control ramp having a cam surface fixed to the cover handle at a location such that during movement of the cover from the position to close the container, said control finger engages said control ramp and is displaced on said control ramp by a distance proportional to the extent of movement of the cover from the position to close the container, and in a direction along the line passing through the control axis, in the sense away from the central axis, leading said bolt toward the second end position, said cam surface being of a length sufficient to permit automatic rearming of said locking means.

10. A device as defined in claim 4 wherein said bolt means and said tumbler each comprise a compression spring disposed for causing said bolt means and said tumbler to undergo elastic movement.

11. A pressure cooker appliance comprising: a container; a cover for closing said container, said cover having a central axis; a flow limiting valve mounted in said cover, said valve being movable between an open position for permitting flow of fluid out of said appliance and a closed position for blocking flow of fluid out of said appliance; and a device for controlling said flow limiting valve, said device comprising a cover handle carried by said cover and bolt means mounted in said cover handle for movement between first and second end positions along a line passing through the central axis, said bolt means being operatively associated with said valve for permitting free displacement of said valve when said bolt means is in said first end position and for preventing said valve from moving to said closed position when said bolt is in said second end position, and wherein:

said bolt means comprise biasing means for elastically urging said bolt means toward said first end position; and said device further comprises means defining an automatic locking-unlocking system coupled with said bolt means for controlling movement of said bolt means between said first and second end positions, said system having a first state for locking said bolt means in said second end position and a second state for automatically unlocking said bolt means when said cover is brought into a position to close said container.

* * * * *